United States Patent [19]

Yamamoto

[11] E Re. 29,759

[45] Reissued Sep. 12, 1978

[54] FUEL INJECTION TYPE ROTARY PISTON ENGINE

[75] Inventor: Kenichi Yamamoto, Hiroshima, Japan

[73] Assignee: Toyo Kogyo Co., Ltd., Japan

[21] Appl. No.: 692,384

[22] Filed: Jun. 3, 1976

Related U.S. Patent Documents

Reissue of:

[64] Patent No.: 3,901,198
Issued: Aug. 26, 1975
Appl. No.: 463,830
Filed: Apr. 24, 1974

[30] Foreign Application Priority Data

Apr. 30, 1973 [JP] Japan ..... 48/51262

[51] Int. Cl.[2] ..... F02B 53/10
[52] U.S. Cl. ..... 123/205
[58] Field of Search ..... 123/8.09, 8.11, 8.13, 123/8.45

[56] References Cited

U.S. PATENT DOCUMENTS

| | | | |
|---|---|---|---|
| 3,244,153 | 4/1966 | Froede | 123/8.45 |
| 3,347,213 | 10/1967 | Froede | 123/8.45 |
| 3,412,716 | 11/1968 | Tausch et al. | 123/8.13 |
| 3,476,092 | 11/1969 | Yamamoto | 123/8.13 X |
| 3,514,235 | 5/1970 | Yamauchi | 123/8.45 |
| 3,882,828 | 5/1975 | Honiden | 123/8.09 |
| 3,905,337 | 9/1975 | Shimoji et al. | 123/8.09 |
| 3,958,539 | 5/1976 | Satow et al. | 123/8.09 |

FOREIGN PATENT DOCUMENTS

| | | | |
|---|---|---|---|
| 2,411,698 | 9/1975 | Fed. Rep. of Germany | 123/8.13 |

*Primary Examiner*—Carlton R. Croyle
*Assistant Examiner*—Michael Koczo, Jr.
*Attorney, Agent, or Firm*—Fleit & Jacobson

[57] ABSTRACT

Fuel injection type rotary piston engine having side air intake ports formed in the side housings and peripheral air intake port or ports formed in the rotor housing, said side air intake ports being closed during light load or low speed operation of the engine while the peripheral air intake ports are still open, the peripheral ports having an effective passage area which is small in relation to that of the side ports.

12 Claims, 3 Drawing Figures

FUEL INJECTION TYPE ROTARY PISTON ENGINE

Matter enclosed in heavy brackets [ ] appears in the original patent but forms no part of this reissue specification; matter printed in italics indicates the additions made by reissue.

The present invention relates to a rotary piston type internal combustion engine, and more particularly to a rotary piston type engine of such a type that includes a casing which comprises a rotor housing having a trochoidal inner wall surface and a pair of side housings secured to the opposite sides of the rotor housing, and a substantially polygonal rotor disposed in said casing for revolution and rotation with apices thereof in sliding contact with the trochoidal inner wall so as to define working chambers in the casing.

It has already been proposed in this field of art to provide a fuel injection type rotary piston engine having air intake port means formed in one of the side housings and auxiliary air intake port means formed in the rotor housing. In the known arrangement, air is taken into the working chamber through both of the air intake port means throughout the engine operation. Therefore, during light load or low speed operation of the engine, fresh air taken into the working chamber is made turbulent so that it becomes very difficult to obtain fuel-air mixture of stratified condition.

The present invention therefore has an object to provide a fuel injection type rotary piston engine having means for preventing intake air from becoming turbulent during light load or low speed operation of the engine.

Another object of the present invention is to provide a fuel injection type rotary piston engine in which fuel-air mixture of stratified condition can readily be formed in the working chamber during light load or low speed operation of the engine.

According to the present invention, there is provided a fuel injection type rotary piston engine including a rotor casing which comprises a rotor housing having a trochoidal inner wall and a pair of side housings secured to the opposite sides of the rotor housing to define a rotor chamber therein, a substantially polygonal rotor disposed in said rotor chamber for revolution and rotation therein with apices thereof in sliding contact with said trochoidal inner wall of the rotor housing so as to define working chambers between the casing and the rotor, first air intake port means formed in at least one of said side housings so as to open into the rotor chamber, first air intake passage means communicating with said first air intake port means and having first throttle valve means disposed therein, second air intake port means formed in said rotor housing so as to open into the rotor chamber, second air intake passage means communicating with said second air intake port means and having second throttle valve means disposed therein, means for closing said first throttle valve means in said first air intake passage means during light load operation of the engine while the second throttle valve of said second air intake passage means is still open, and fuel injection means for fuel into one of the working chambers into which fresh air is introduced. Hithertofore, it has been recognized that an air intake port formed in the side housing is particularly suitable for light load or low speed operation since the overlapping period can be minimized and that a peripheral air intake port formed in the rotor housing is particularly suitable for heavy-load or high speed operation because it can provide an increased air intake efficiency although there may be relatively large overlapping period. The invention, however, proposes to use only the peripheral air intake port means during light load or low speed engine operation in order to obtain a better atomization of fuel, and a fuel-air mixture of laminated condition. Therefore, according to a preferred mode of the present invention, the effective cross-sectional area of the peripheral or second intake port means is small as compared with that of the side or first air intake port means with preferable range of the ratio of the areas between 1 to 3 and 1 to 69, so that the overlapping period of the second air intake port means can be minimized.

The above and other objects and features of the present invention will become apparent from the following descriptions of preferred embodiments taking reference to the accompanying drawings, in which.

Figure 1:
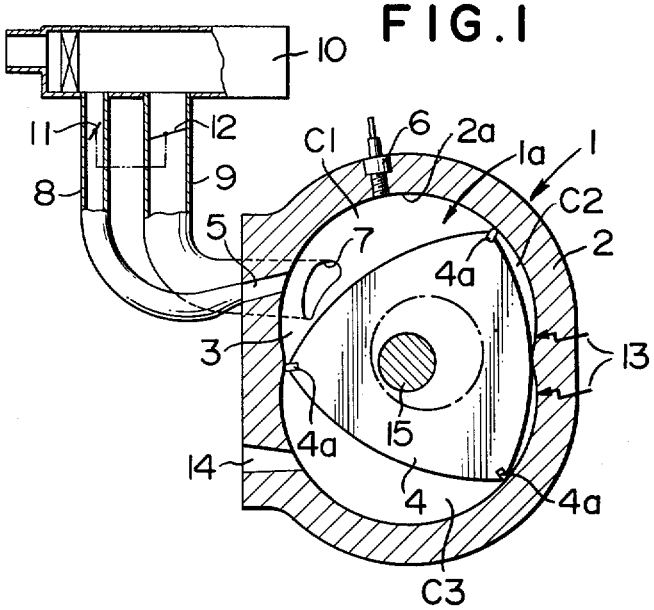
FIG. 1 is a sectional view of a rotary piston engine in accordance with one embodiment of the present invention.

Referring now to the drawings, particularly to FIG. 1, there is shown a rotary piston type engine including a casing 1 which comprises a rotor housing 2 having a trochoidal inner wall 2a, and a pair of side housings 3 secured to the opposite sides of the rotor housing 2 so as to define a rotor chamber 1a in the casing 1. A substantially triangular rotor 4 is disposed in the rotor chamber 1a and has apex seals 4a provided on the apices thereof for slidable sealing contact with the inner wall 2a of the rotor housing 2 so as to define working chambers C1, C2 and C3 in the casing 1, of which volumes are continuously changed as the rotor 4 rotates. In the illustrated position of the rotor 4, the working chamber C1 is in the intake stroke, the chamber C2 in the compression stroke and the chamber C3 in the expansion and exhaust stroke.

The rotor housing 2 of the casing 1 is formed with a peripheral air intake port 5 opening into the rotor chamber 1a at the working chamber C1 which is in the intake stroke. Further, the rotor housing 2 is provided with a fuel injection nozzle 6 for injecting nozzle into the working chamber C1. At least one of the side housings 3 is provided with a side air intake port 7 opening to the rotor chamber 1A at the working chamber C1 which is in the intake stroke. The intake ports 5 and 7 respectively communicate with intake passages 8 and 9 which extend between an air cleaner 10 and the intake ports 5 and 7. The passages 8 and 9 are provided with throttle valves 11 and 12, respectively, which are simultaneously actuated by suitable means (not shown) well known in the art.

The peripheral intake port 5 has an effective passage area which is small in relation to that of the side intake port 7 or the ports 7 when they are formed in both of the side housings 3. Preferable ratio of the effective passage area of the port 5 to that of the port 7 is between 1 to 3 and 1 to 9. The term "effective passage area" as used herein will mean the minimum passage area of the whole passage including the intake port itself and the intake passage portion. The throttle valves 11 and 12 are interconnected with each other and, as shown in FIG. 1, the throttle valve 11 remains slightly open when the throttle valve 12 is completely closed.

The rotor housing 2 is also provided with ignition plugs as schematically shown by 13 and also with an exhaust port 14. The reference numeral 15 designates an output shaft of the engine.

During light load or low speed operation of the engine, the throttle valve 12 is closed while the throttle valve 11 remains slightly open as shown in FIG. 1 so that fresh air is taken only through the intake passage 8 and the peripheral intake port 5 into the working chamber C1 which is in the intake stroke. Since the peripheral intake port 5 has a reduced effective passage area as previously described, a stable intake air flow of substantial speed can be assured in the working chamber $C_1$. At a suitable period of operation cycle, fuel is injected through the nozzle 6 into the intake air flow in the working chamber $C_1$ whereby the fuel is atomized and mixed with the air to form a fuel-air mixture. Since the intake air is introduced into the working chamber $C_1$ with a substantial flow speed, it is possible to form relatively rich mixture at a portion of the working chamber and relatively lean mixture and/or air at the remaining portion of the chamber. Thus, it is possible to make the mixture in the working chamber into a laminated condition, and the mixture is ignited by the ignition plugs 13 at the rich portion thereof. Since the peripheral intake port is of a reduced area, it is possible to decrease the overlap period, so that possibility of intake air being diluted by combustion gas can be substantially decreased.

In the illustrated structure, the peripheral air intake port 5 is constituted by a single port opening, however, it should be noted that the port 5 may be divided into a plurality of small holes.

Under a high speed and high load operation of engine, the throttle valve 12 is opened and air is allowed to flow through the intake passage 9 into the working chamber $C_1$. Thus, increased amount of air is supplied to the working chamber $C_1$ to provide an increased engine output.

Figure 2:
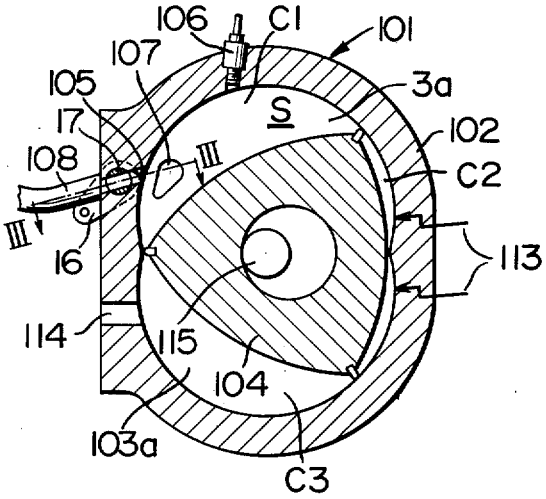
FIG. 2 is a sectional view similar to FIG. 1 but showing another embodiment of the present invention.
Figure 3:
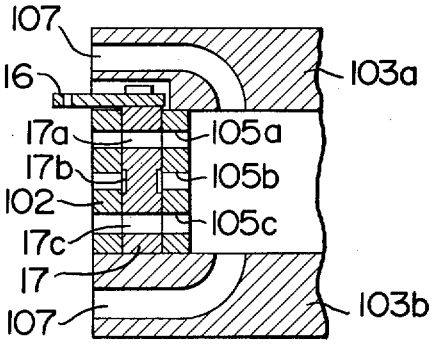
FIG. 3 is a sectional view taken substantially along the line III—III in FIG. 2.

Another embodiment of the present invention is shown in FIGS. 2 and 3. The engine shown in these drawings is substantially the same as that shown in FIG. 1, so that detailed descriptions of its structure and function will not be repeated. Further, corresponding parts in the embodiment in FIGS. 2 and 3 are designated by the same reference numerals as in FIG. 1 with addition of 100.

In this embodiment, the peripheral air intake port 105 formed in the rotor housing 102 is provided with a valve 17 which is rotatably received in the rotor housing 102 and has an actuating lever 16 secured to one end thereof. As shown in FIG. 3, the intake port 105 is divided into three holes 105a, 105b and 105c, and the valve 17 also has passages 17a, 17b and 17c which respectively cooperate with the holes 105a, 105b and 105c of the intake port 105. In the drawing, the passages 17a and 17c are shown in the form of transversely extending through-holes and the passage 17b is shown as a circumferential groove.

According to this alternative embodiment of the present invention, it is possible to control the flow speed and amount of intake air through the intake port 105 by changing the position of the valve 17.

The invention has thus been shown and described with respect to preferred embodiments, however, it should be noted that the invention is in no way limited to the details of the illustrated structure but changes and modifications may be made without departing from the scope of the appended claims.

I claim:

1. A rotary piston type internal combustion engine comprising a casing including a rotor housing having a trochoidal inner peripheral wall and a pair of side housings secured to the opposite sides of said rotor housing to define a rotor chamber therein, a substantially polygonal rotor rotatably mounted in said rotor chamber and having apices slidingly contacting the trochoidal inner peripheral wall of the rotor housing so as to define working chambers between the casing and the rotor, means for rotating the rotor so as to effect volumetic changes of each working chamber through intake, compression, combustion and exhaust strokes, first air intake port means formed in at least one of said side housings so as to open into the working chamber which is in the intake stroke, first air intake passage means communicating with said first air intake port means and having first throttle valve means positioned therein, second air intake port means formed in said rotor housing so as to open into the working chamber which is in the intake stroke, second air intake passage means communicating with said second air intake port means and having second throttle valve means positioned therein, means for closing said first throttle valve means in said first air intake passage means during light load operation of the engine while keeping the second throttle valve of said second air intake passage means open, and fuel injection means for injecting fuel into the working chamber which is in the intake stroke.

2. Rotary piston engine in accordance with claim 1 in which said second air intake port means comprises a single intake port.

3. Rotary piston engine in accordance with claim 1 in which said second air intake port means comprises a plurality of small holes.

4. Rotary piston engine in accordance with claim 1 in which said second air intake port means has an effective passage area smaller than that of the first air intake passage means.

5. Rotary piston engine in accordance with claim 4 in which the ratio of the effective passage area of the second air intake port means to that of the first air intake port means is between 1 to 3 and 1 to 9.

6. Rotary piston engine in accordance with claim 1 in which said second air intake passage means is provided with valve means for controlling the passage area thereof.

*7. A rotary piston type internal combustion engine comprising a casing including a rotor housing having a trochoidal inner peripheral wall and a pair of side housings secured to the opposite sides of said rotor housing to define a rotor chamber therein, a substantially polygonal rotor rotatably mounted in said rotor chamber and having apices slidably contacting the trochoidal inner peripheral wall of the rotor housing so as to define working chambers between the casing and the rotor, means for rotating the rotor so as to effect volumetric changes of each working chamber through intake, compression, combustion and exhaust strokes, first fluid intake port means formed in at least one of said side housings so as to open into the working chamber which is in the intake stroke, first fluid intake passage means communicating with said first fluid intake port means and having first throttle valve means positioned therein, second fluid intake port means formed in said*

*rotor housing so as to open into the working chamber which is in the intake stroke, second fluid intake passage means communicating with said second fluid intake port means and having second throttle valve means positioned therein, means for closing said first throttle valve means in said first fluid intake passage means during light load operation of the engine while keeping the second throttle valve of said second fluid intake passage means open and means for introducing fuel into the working chamber during the intake stroke.*

*8. Rotary piston engine in accordance with claim 7 in which said second fluid intake port means comprises a single intake port.*

*9. Rotary piston engine in accordance with claim 7 in which said second fluid intake port means comprises a plurality of small holes.*

*10. Rotary piston engine in accordance with claim 7 in which said second fluid intake port means has an effective passage area smaller than that of the first fluid intake passage means.*

*11. Rotary piston engine in accordance with claim 7 in which the ratio of the effective passage area of the second fluid intake port means to that of the first fluid intake port means is between 1 to 3 and 1 to 9.*

*12. Rotary piston engine in accordance with claim 7 in which said second fluid intake passage means is provided with valve means for controlling the passage area thereof.*

* * * * *